United States Patent [19]

Sciaky

[11] 4,213,554
[45] Jul. 22, 1980

[54] FRICTION WELDING MACHINE

[75] Inventor: Mario M. Sciaky, Paris, France

[73] Assignee: Sciaky Intertechnique, S.A., Fribourg, Switzerland

[21] Appl. No.: 972,447

[22] Filed: Dec. 22, 1978

[30] Foreign Application Priority Data

Jan. 5, 1978 [FR] France ............................. 78 00260

[51] Int. Cl.³ ..................... B23K 20/12; B23K 37/02
[52] U.S. Cl. ......................................... 228/2; 228/47
[58] Field of Search ..................................... 228/2, 47

[56] References Cited

U.S. PATENT DOCUMENTS

| | | | |
|---|---|---|---|
| 3,805,371 | 4/1974 | Edwards | 228/2 X |
| 3,934,780 | 1/1976 | Flax | 228/2 |

Primary Examiner—Milton S. Mehr
Assistant Examiner—K. J. Ramsey
Attorney, Agent, or Firm—Julius L. Solomon

[57] ABSTRACT

Machine for friction welding two parts comprising a first non-rotatable means for clamping the first of the two parts and a second rotatable means for clamping the second part. The machine is characterized in that the first non-rotatable clamping means is movable along the axis of rotation of the second means and in that the second rotatable clamping means is made up of a motorized mandril and a headstock clamping between them the second part, this headstock being movable along the axis of rotation and being provided with means for the support of the two pieces co-axially.

9 Claims, 6 Drawing Figures

Figure: 1

FRICTION WELDING MACHINE

The present invention concerns a mechanical system which extends the application of the Friction Welding Process to certain types of assemblies such as, for example, bottom or end bell to a cylindrical vessel, and more particularly, an automobile wheel made up of a disc and a rim.

Friction welding machines are well known and they have been applied essentially to the assembly of two pieces of revolution by driving one of the parts in rotation while the other remains fixed. The parts are solidly clamped in appropriate chucks, one of which is driven in rotation and the other is fixed. At the beginning of the operation, the two pieces are placed into contact under low pressure.

The friction which results from the one part rubbing on the other produces an increase in temperature in the plane of the joint. After a pre-determined time, the rotation is stopped and the parts forced one against the other rapidly and energetically, thus producing a forging action which results in a weld of good quality.

Friction welding machines which have heretofore been available cannot be used to weld a part having the form of a disc to a ring or cylinder nor to produce, for example a water-tight cylindrical container or to join the disc to a rim to make up an automobile wheel. This is so because the clamping means by which these machines are equipped, because of their conception, do not allow the parts to be locked and maintained in position with the rigidity necessary to transmit the friction couple which is developed during the welding operation.

The object of the present invention is to allow the welding by friction of such assemblies. In accordance with the invention, a new conception of clamping elements permits the maintenance of the pieceparts in position without deformation and in a fashion which allows for the application of a sufficient clamping force and the transmission of the friction couple.

The clamping means further permits the parts to be welded with precision and the parts to be fed and ejected from the welding machine at high rates.

The present invention thus furnishes a friction welding means which is particularly adapted to the automatic fabrication of automobile wheels and also other assemblies such as hollow cylindrical containers furnished with end closures, tanks, pressure vessels, etc.

In accordance with the invention, the functions which allow the process to be carried out are separated. To this effect, means are provided for carrying the rim and a disc pre-assembled to the welding position. The assembly is lifted vertically in such a way as to trap it between an upper support and the lower support which lifted it.

The upper support is mounted on a shaft, arranged vertically within a bearing, and the shaft is backed up at its end by a thrust bearing. The shaft is connected to a driving mechanism which can impart to it a rotary motion.

The lower support, which backs up the disc against the upper support, is also mounted on a bearing which allows it to be rotated freely by the rotation of the disc.

The rim which has been carried by the lower support to the center of four clamping jaws is clamped strongly, and the arrangement is such that at the moment of clamping, the rim is lifted slightly away from the support which has carried it upward. A guiding system allows the jacks which lift the table to exercise the frictional pressure of the rim against the disc and the forging force at the end of the operation.

There is, therefore, here a distinct separation of the functions which cooperate to effect the process which renders it possible to precisely control each function and also results in a great precision in the alignment of the disc and the rim.

The invention is represented, by a non-limiting example on the attached illustrations in which.

Figure 1:
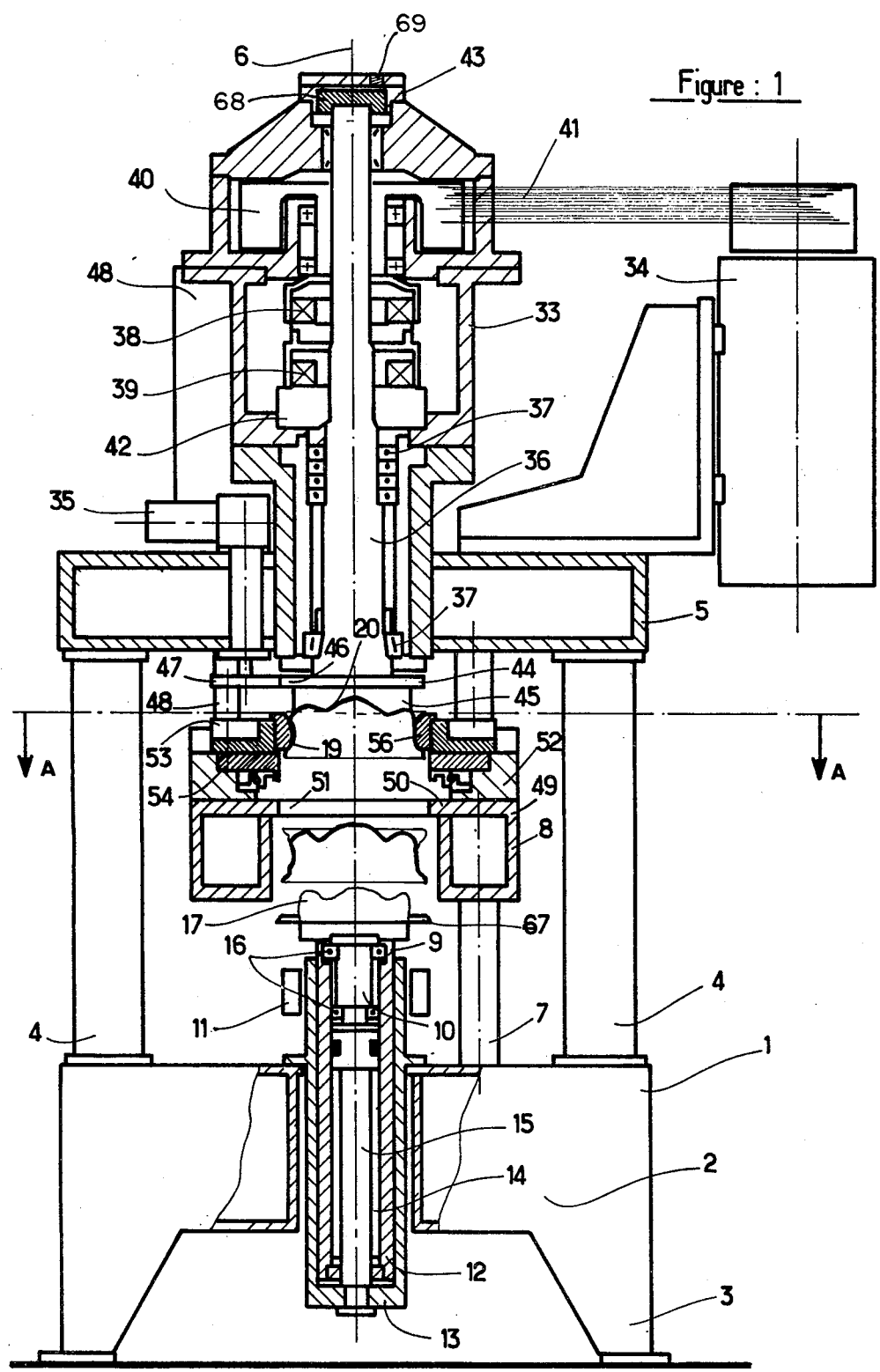
FIG. 1 is a cross-sectional view of the machine.

The machine consists essentially of a frame with four vertical members arranged in the following manner.

A lower part, a mechanically welded base 2 of rectangular form, supported on the ground by four legs 3. Fixed to angles on the base are 4 uprights 4, which support a welded plate structure.

This particular form of structure has been utilized for the application described as an example. However, a press in the form of a C-frame, closed or open, may also be conveniently utilized.

In any case, the structure defines a vertical axis 6 along which is applied the welding force.

Symmetrically with respect to axis 6, the structure supports two columns 7 shown on FIGS. 2 & 3 which serve as guides for the clamping jaw carriage 8 described below.

In another realization, it is possible to combine two opposing uprights and the function of guiding the jaw carrying carriage without leaving the framework of the invention.

The equipment of the lower base 2 of the plate 5, and the jaw carrying carriage 8 is described below.

The equipment in the base consists essentially of an elevator 9 (a lifting mechanism) supplied with a rotatable headstock 10 and a transfer mechanism.

The elevator 9 consists of a piston whose vertical axis coincides with the general axis 6 of the machine. It furnishes an upward and downward vertical movement under the action of fluid under pressure.

This lift 9 comprises a cylinder jacket 13, a moving part 12 and an internal return chamber 14 working in conjunction with a central shaft 15.

The rotating headstock has its axis of rotation coinciding with the axis 6 of the machine. The rotatable part mounted on the bearings 16 carries a lower fixture 17 and is lockable in position by a jack apparatus 18 visible on FIG. 2.

The equipment in the base 2 consists of a transfer apparatus whose purpose is to transport the assembly to be welded, consisting of, in the particular example described here, a disc 20 and a rim 19, prepositioned one with respect to the other, from the position 21 where the loading is effected, whether it be manual or automatic, to the position called the "prehension" point defined by the axis 6 of the machine.

Figure 2:
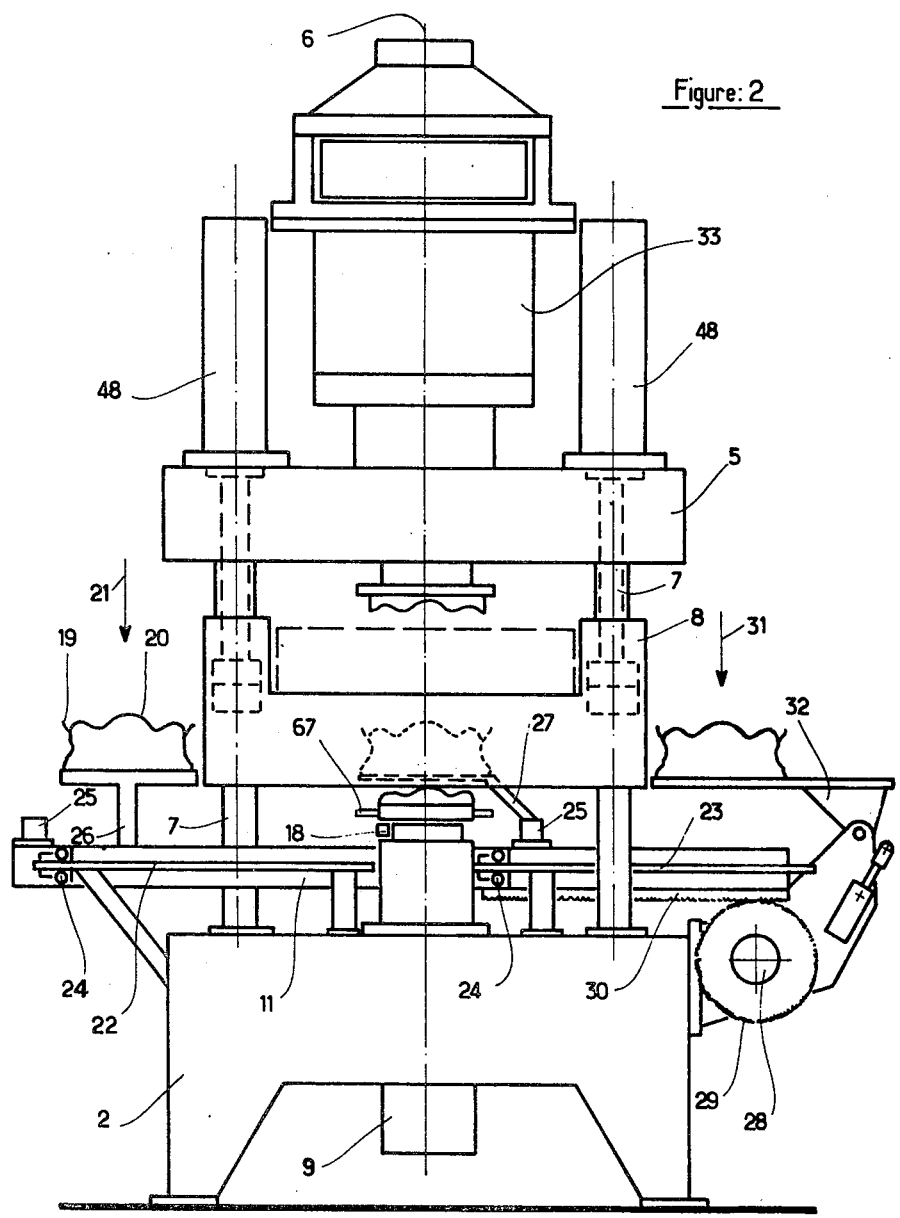
FIG. 2 is a partial view from the left of FIG. 1.

This transfer mechanism consits of: two horizontal rails, 22 and 23 colinear and visible on FIG. 2, upon which slides an assembly, mounted on rollers 24, consisting of two bars 11 and the spacers 25. This assembly is equipped with two "risers and supports" (26 & 27)

spaced by a distance equal to a transfer step, that is to say the distance from the loading position to the position of "prehension" (axis).

A motor reducer 28 acts through pinion 29 on a rack 30, fixed on the movable assembly, and communicates to this mobile assembly a to and fro movement (forward and backward). In this movement the wheel "entering to weld" passes from the "loading" position to the position "prehension," while the wheel leaving the welding position passes to the position 31 where a tilt or swing ejector 32 removes it from the machine.

The plate 5 is essentially equipped with the principal rotating mandril 33, its driving motor 34 and an automatic indexing apparatus 35. The principal mandril or chuck 33 consists of a spindle 36 which turns about its axis, which coincides with axis 6 of the machine and consequently also coincides with the axis of the head 10 of the elevator (lifting mechanism).

The bearing assembly 37 is provided to permit this rotation and also resist the forging force during its application as will be explained later in the section describing the machine functioning.

The clutch 38 and a brake 39, act on the spindle 36 which has fastened to it, a drive pulley 40, which is driven by the drive belts 41 and the direct current motor 34, either to drive the spindle or to brake it with respect to frame 42.

The upper end of the spindle (36) has fitted to it a piston (68) acting within hydraulic cylinder (43) which provides means to apply a force equal to approximately 90 percent of the welding force required between the two parts to be welded so as to obtain on the bearing (37) a resultant force which is reduced with respect to the forging force in order that the service life of the bearing be augmented.

The lower extremity of the spindle comprises a plate 44, carrying upper tool 45, which is equipped with a toothed wheel 46 which is meshed with the pinion 47 to re-index the plate which is driven, by the motor reducer assembly 35 so as to provide for repositioning, after the welding operation, of the assembly consisting of the upper tool 45, the welded parts 19 & 20, and the lower tool 17, to its original position after having given the welded part its proper orientation with respect to the transfer apparatus. The upper tool 45 is adapted to the form of the disc 20 or more generally, to the cap of tanks to be welded.

The upper frame supports two hydraulic jacks 48 arranged symmetrically with respect to the axis 6 and acting parallel to this axis and whose piston rods are attached to the mobile carriage jaw carrier 8.

The moving carriage 8 is made up of a frame 49 having a rectangular form to slide vertically on the columns 7 by the action of jacks 48.

Figure 3:
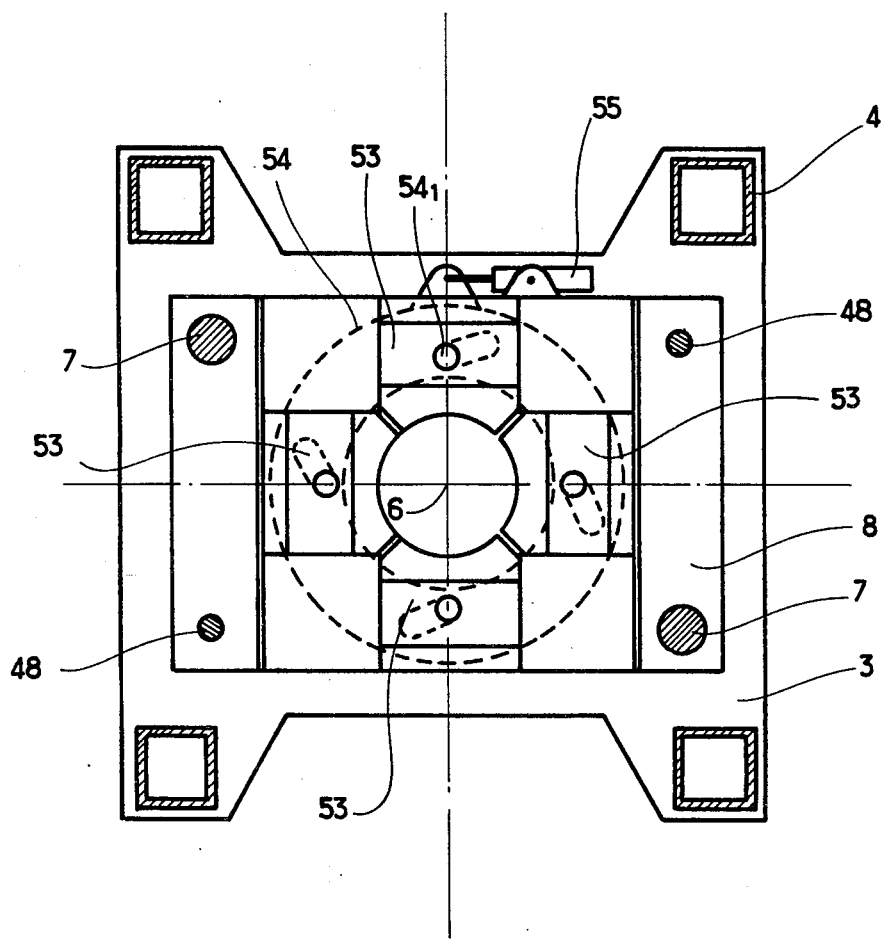
FIG. 3 is a cross-section of A—A of FIG. 1.

FIG. 3 shows the effective position of guiding columns 7 and the jacks 48 of the carriage.

The carriage consists of an upper machined face 50 perpendicular to the axis 6 and a free-central passage 51.

On the face 50 is fixed the tooling 52 for clamping the rim or more generally, the hollow body to be welded, comprising the jaw carriers 53 having a concentric sliding action towards the axis 6. FIG. 3 shows the relative disposition of these parts.

The jaw carriers 53 are controlled simultaneously by fingers $54_1$ carried by the crown or ring 54 which is activated by the jack 55. These fingers displace themselves in the longitudinal orifices provided in an inclined position on the jaw carrier 53.

Each jaw carrier receives a jaw 56 whose form is adapted to the part which it must hold in place, represented in this particular case by the rim 19.

Figure 4:
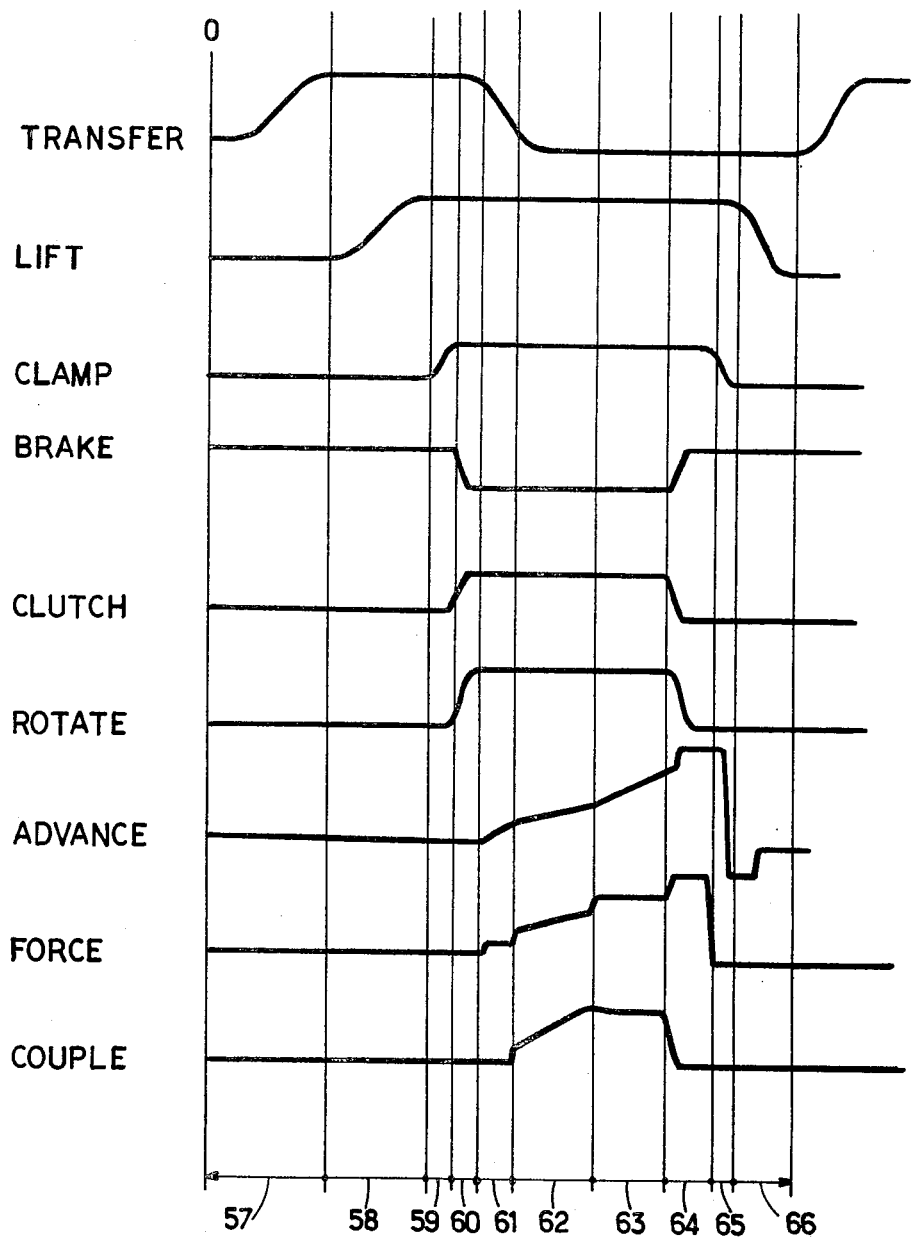
FIG. 4 is a representational diagram of the functioning of the machine.

The functioning of the machine may be explained as follows. The functioning of the machine is controlled by an automatic control cabinet, which is not shown, as well as by a central hydraulic system that furnishes the moving fluid under pressure to produce motion and to deliver forces where required and which develops a series of characteristic functions in the present invention represented on the diagram of FIG. 4.

The assembly of two prepositioned pieces to be welded is put in place at position 21 on the support 26 of the mobile transfer assembly. The work is displaced by the action of motor 28 in such a way that the two pieces find themselves in the position of "prehension," that is to say along the axis 6 of the machine and at a level lower than that of the carriage 8.

This phase corresponds to the portion 57 of the diagram. The action of the elevator 9 follows in turn and the pieces are elevated by the tool carrier 17, which passes between the two bars 11 of the transfer apparatus and towards the carriage 8 and are put in the position for welding. The elevation is represented at 58.

At the end of its travel, the elevator applies the disc against the upper tooling 45. The force to lift and lower the elevator furnishes thus the function of clamping necessary to drive the wheel in accordance to the invention.

The lower tool is conceived in such a manner that during the first part of the lifting of the parts, the disc 20 is carried slowly to the rim 19 which rests on the lateral extension 67 of the lower tooling.

After the parts are lifted, phase 59, the rim is clamped. In the movement of clamping the jaws act all at once, by their inclined edges, to lift the rim from the support 67 and thus permit the free rotation of the lower tool carrier.

After being clamped, the disc 20 is then lightly spaced from the rim 19, which is itself separated from the support 67 of the lower tooling.

At this time follow the steps of putting the parts into rotation, phase 60, by the unlocking of the lower plate, the freeing of the brake, and the activation of the clutch. The spindle, in turning, puts into rotation the lower tool carrier head. One controls then at 61, the advance of the carriage towards the disc, just at the moment where the contact between the pieces is produced. This is the phase of pre-heating at 62.

In accordance with the invention, the full force is not applied immediately to the rim and disc.

In effect, because of the tolerances in machining, the bearing of the disc on the rim is not effected, at the beginning, except on a small part of its periphery. A direct application of the final force will provoke extensive tearing of the material without giving rise to the effect of heating. That is why it is applied progressively to permit the zone of contact to be heated and to extend along the full periphery.

According to the invention, the couple furnished by the motor is measured. When this reaches its maximum, it indicates that the totality of the periphery along the weld line is in contact and that the phase of proper heating at 63 can commence. An electric measuring device allows one to determine this instance.

One then applies, to the carriage 8 by means of the jacks 48, a pressure which determines a force corresponding to the heating rate desired.

At the end of the heating, a timer intervenes and the rotation is stopped by the successive functioning of the clutch and brake in a precise manner.

The forging force is applied at 64 for a pre-determined period as regulated by another timer.

At the completion of the forging, the jaws of the carriage are unlocked and they come to rest at phase 65.

During the welding operation, the transfer is returned to its original position and at the descent of the elevator, phase 66, a welded wheel is deposited on the extensions 27 of the transfer thus permitting its ejection during the phase at the start of the following cycle.

Figures 5, 6:
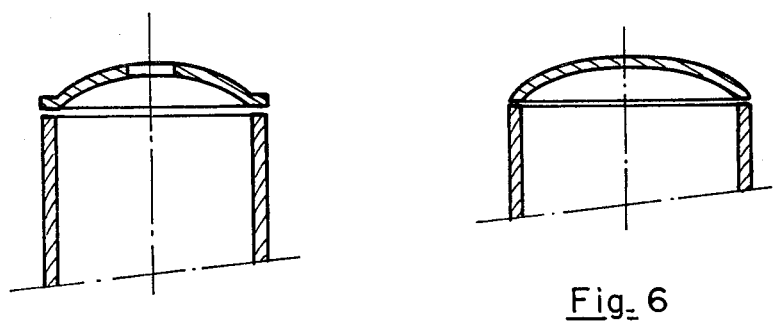
FIGS. 5A and 5B represent examples of parts other than wheels, which may be assembled in accordance with the invention.

Thus as has been shown, this type of machine permits the application of the friction welding process to particular assemblies. Some examples are illustrated in FIG. 5. FIG. 5A represents a body of a shock absorber in which the closing cap is formed with a flat at the periphery in order that it may be friction welded through the use of this invention.

FIG 5B illustrates a tank having a thin wall to which a cap having the curved form shown can be welded on a machine constructed in accordance with the invention. Prior to the present invention, caps of this form could not be effectively clamped through the use of conventional mandrils.

I claim:

1. A machine for friction welding two parts, comprising a first non-rotatable means for clamping the first of the said parts and a second rotatable means for clamping the second part, characterized in that the first non-rotatable clamping means is movable along the axis of rotation of said second rotatable means and that the said rotatable clamping means is composed of a driven mandril and a headstock for clamping between them the second workpiece, this headstock being movable along the said axis of rotation and being provided with means for supporting the two pieces co-axially.

2. A machine in accordance with claim 1 characterized in that the means provided on the headstock for the co-axial support of the two parts to be welded by friction is constructed from one part which has a central form for the support of the said second part to be welded and a lateral edge for the support of the said first part to be welded.

3. A machine in accordance with claim 2 characterized in that the central form and the lateral edge on the headstock are fabricated in such a way that the two aforementioned parts, displaced along the axis by the headstock, are not in contact one against the other when initially clamped.

4. A machine in accordance with claim 3 characterized in that the said first non-rotatable clamping means which is movable axially is constructed in such a way that it lifts the aforementioned first part by its lateral edge during the clamping of said first part.

5. A machine in accordance with claim 4 characterized in that it includes a reaction jack provided in connection with the mandril and acting against the headstock and the said first clamping means.

6. A machine in accordance with claim 5 characterized in that it includes transfer rails for the parts to be welded and parts already welded, these rails being arranged laterally and on each side of the said headstock.

7. A machine in accordance with claim 6 characterized in that the two means for clamping are arranged co-axially along a vertical axis.

8. A machine in accordance with claim 7 characterized in that it comprises a fixed base which is composed of two parts which support face to face, one, a mandril, and the other, the headstock, forming the aforesaid second means for clamping, the first means for clamping being disposed on a carriage movable axially on the columns between the two parts.

9. A machine in accordance with claim 8 which includes a measuring device for determining the maximum couple delivered by the motor which drives the first clamping means in rotation, the said couple measuring means controlling the jack which determines the pressure of the said second means of clamping on the said first clamping means.

* * * * *